United States Patent
Gopal et al.

(10) Patent No.: US 8,289,368 B2
(45) Date of Patent: Oct. 16, 2012

(54) INTELLIGENT GROUPING AND SYNCHRONIZED GROUP SWITCHING FOR MULTIMEDIA CONFERENCING

(75) Inventors: Rajat Gopal, Shrewsbury, MA (US); Alan B. Johnson, Saint Louis, MO (US)

(73) Assignee: Avaya Inc., Basking Ridge, NJ (US)

( * ) Notice: Subject to any disclaimer, the term of this patent is extended or adjusted under 35 U.S.C. 154(b) by 964 days.

(21) Appl. No.: 12/335,174

(22) Filed: Dec. 15, 2008

(65) Prior Publication Data
US 2010/0149306 A1 Jun. 17, 2010

(51) Int. Cl.
*H04N 7/14* (2006.01)
(52) U.S. Cl. ............ 348/14.09; 348/14.12; 348/14.08
(58) Field of Classification Search .... 348/14.01–14.16; 709/204, 205, 246; 370/260–261
See application file for complete search history.

(56) References Cited

U.S. PATENT DOCUMENTS

| | | | |
|---|---|---|---|
| 4,531,024 A | 7/1985 | Colton et al. | |
| 4,574,374 A | 3/1986 | Scordo | |
| 6,580,447 B2 | 6/2003 | Shimizu et al. | |
| 7,031,700 B1 * | 4/2006 | Weaver et al. | 455/420 |
| 7,679,640 B2 * | 3/2010 | Eshkoli et al. | 348/14.09 |
| 2007/0156924 A1 * | 7/2007 | Ramalingam et al. | 709/246 |

OTHER PUBLICATIONS

"Intellivic: Conference Server", Intellivic website, available at http://www.intellivic.com/index.php?page=prod_cs, as early as Jul. 1, 2005, printed on Apr. 14, 2009, pp. 1-2.
"Welcome to Vidyo", IP Video Conferencing/Desktop Video Conferencing/Vidyo website, available at http://www.vidyo.com/, as early as Oct. 18, 2000, printed on Apr. 14, 2009, pp. 1-3.
Barnes, et al., "Centralized Conference Manipulation Protocol" IETF Internet Draft, Nov. 2008, pp. 1-84.
Handley, et al., "SDP: Session Description Protocol", RFC 4566, Jul. 2006, pp. 1-50.
Levin, et al., "Centralized Conference Control Protocol," IETF Internet Draft, Dec. 2005, pp. 1-50.
Rosenberg, et al., "SIP:Session Initiation Protocol", RFC 3261, Jun. 2002, pp. 1-80.

* cited by examiner

*Primary Examiner* — Melur Ramakrishnaiah
(74) *Attorney, Agent, or Firm* — Sheridan Ross P.C.

(57) ABSTRACT

The present invention provides methods, devices, and systems for synchronizing group switching of multimedia streams for conferencing applications. More specifically, the present invention provides mechanisms for grouping, mapping, and switching endpoints for role-based multimedia collaboration.

16 Claims, 8 Drawing Sheets

INTELLIGENT GROUPING AND SYNCHRONIZED GROUP SWITCHING FOR MULTIMEDIA CONFERENCING

FIELD OF THE INVENTION

The invention relates generally to communication systems and more particularly to multimedia conferencing solutions.

BACKGROUND

The use of multimedia conferencing or telephony, which allows remote parties to both see and hear one another, is becoming increasingly popular. Multimedia telephony refers to communications using both video, audio, and/or data transmitted over a communications network. Such applications facilitate remote communications by providing a visual image of each conference participant. Accordingly, multimedia conferencing allows parties to communicate audibly and visibly, without requiring lengthy and expensive travel.

In a typical multimedia telephony application, a camera is positioned to obtain an image of the participants at each endpoint of the communication. The image of the participants at one endpoint is then provided to the participants at the other endpoints. Accordingly, the multimedia telecommunications interaction can include two or more endpoints, and one or more participants at each endpoint.

The image obtained from an endpoint is displayed to participants at other endpoints. For an endpoint in communication with two or more other endpoints, most commercially available multimedia conferencing systems either use a multi-point conferencing unit (MCU) to mix and redistribute video, audio, and data to all endpoints in a conference or use a centralized server to switch a video or audio stream from one endpoint to all other endpoints. Almost all switching solutions send multiple streams to all other endpoints in the conference and then employ special functionality at each endpoint.

Multimedia mixing with an MCU in a conference is computationally expensive and introduces latency, which adversely affects video and/or audio quality. On the other hand, switching a single stream with a centralized server has the limitation of only allowing one speaker to be displayed per site at a time.

Scalable video coding has been developed in an effort to overcome some of the shortcomings associated with utilizing an MCU. With scalable video coding the traditional MCU is replaced by a stream router. Each endpoint is equipped with a specialized encoder and decoder which implements scalable video coding. The centralized router examines each incoming video packet and routes it to the appropriate destination. The receiving endpoint has the responsibility of decoding video packets from multiple streams and mixing them together to create a composite image. This approach requires an infrastructure/hardware upgrade for every conference endpoint such that the endpoints are equipped with specialized encoders/decoders.

Another solution that has been developed is voice activated or operator selected switching. In this solution, the loudest speaker is identified based on voice energy or a speaker is selected by the conference operator and that identified/selected speaker's multimedia stream is switched to all endpoints in the conference. Most multimedia conference equipment vendors support this particular feature, but it is a limited feature in that only a single multimedia stream can be selected for display to all other participants.

Yet another solution that has been developed is mesh switching. In mesh switching the multimedia streams from all endpoints are collected by a centralized server and switched to all other endpoints. The receiving endpoint is responsible for decoding and mixing the signal received from the centralized server. This method requires specialized functionality in the endpoints to decode, scale, and mix multiple streams, thereby increasing the costs associated with utilizing such endpoints.

SUMMARY

These and other needs are addressed by various embodiments and configurations of the present invention. It is thus one aspect of the present invention to provide a grouping scheme for multimedia streams and similar multimedia streams such that each member of a group is mapped to a specific member of another group and the switching of streams is synchronized between groups. In accordance with at least some embodiments of the present invention, a system, device, and method is provided for synchronizing group switching between multiple media streams. The method generally comprises:

connecting a plurality of endpoint devices together in a conferencing session;

creating a first conference group that comprises at least a first and second endpoint;

creating a second conference group that comprises at least a third endpoint;

reading content delivery preferences associated with the first group; and directing content from the at least a first and second endpoint based on the preferences associated with the first group.

Media transcoding, which may include decoding, applying transforms like scaling and rate matching, and then re-encoding, is a computationally expensive process which leads to both capacity as well as quality degradation on the MCU. This invention allows the MCU to optimize the multimedia conference processing such that a combination of intelligent grouping, mapping and switching of media streams is employed to replace transcoding. If transcoding must be employed it is done singularly for the entire group rather than for each endpoint.

It is one aspect of the present invention to provide a low cost telepresence-style multimedia conferencing system with multi-camera to multi-display synchronized switching. Most telepresence systems utilize life size videos of the participants and avoid split-screen images (i.e., in mixed multimedia solutions). By using the proposed grouping technique, multimedia streams from multiple cameras in a meeting room can be switched in synchronization to other meeting rooms with multiple cameras/displays.

There may be several applications of embodiments of the present invention. One such application includes a traditional telepresence system which connects two or more rooms set up with multiple cameras and screens in a particular layout. Embodiments of the present invention may be utilized to allow a distributed or virtual telepresence system to be built where participants would not have to be in the same room. Instead, by using the grouping techniques of the present invention, they users could be virtually put together into a room and then shared with the other room, which could also be a virtual room.

In another application, the participants in a conference may comprise different capabilities. For example, some participants may support high definition video, while others only support regular definition video. Some users may support advanced codecs and others may only support simple codecs. Some may have large screens whereas others may comprise small screens. Using the grouping techniques of the present invention, it is possible to perform conference mixing and/or switching in an optimal way. For example, rather than reducing the conference to the lowest common denominator, multiple mixers could be used to produce, for instance, both high and low definition mixes. When the inputs are all low definition inputs, the output streams would be the same. However, when one or more inputs are high definition, the participants capable of receiving high definition would receive a high definition mix while others would see a low definition mix.

In accordance with at least one embodiment of the present invention, logical grouping of participant endpoints based on capabilities may help to reduce the amount of processing required to facilitate the conference. More specifically, groups can be created based on capability and then the group can be generally assigned the same capability. The group capability may be used when negotiating codecs or creating bridge lines with other groups of different capabilities. In other words, a single bridge line can be created between groups and a single transcoding step can be performed between the groups rather than requiring multiple transcoding steps for each endpoint within the group receiving the media stream. Accordingly, the creating of groups based on capabilities helps to reduce the amount of transcoding and processing necessary when multiple endpoints in one group are receiving a media stream from an endpoint in another group.

In still another application, a multimedia conference may comprise a number of participants using different media types like audio, video, and text to collaborate. Participants may also have different roles and functions in the conference. Using the grouping techniques of the present invention, participants with certain roles and/or access privileges can be grouped together. For instance, a given group may not have the privilege to generate video but could receive video from other groups. Certain participant(s) in a given group can also be granted more privileges as compared to other participants in the same group. As an example, only the designated leader of a group may be allowed to share a whiteboard application.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to provide an efficient mechanism for facilitating a multimedia conference.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, and/or associated communication device.

Figure 1A:
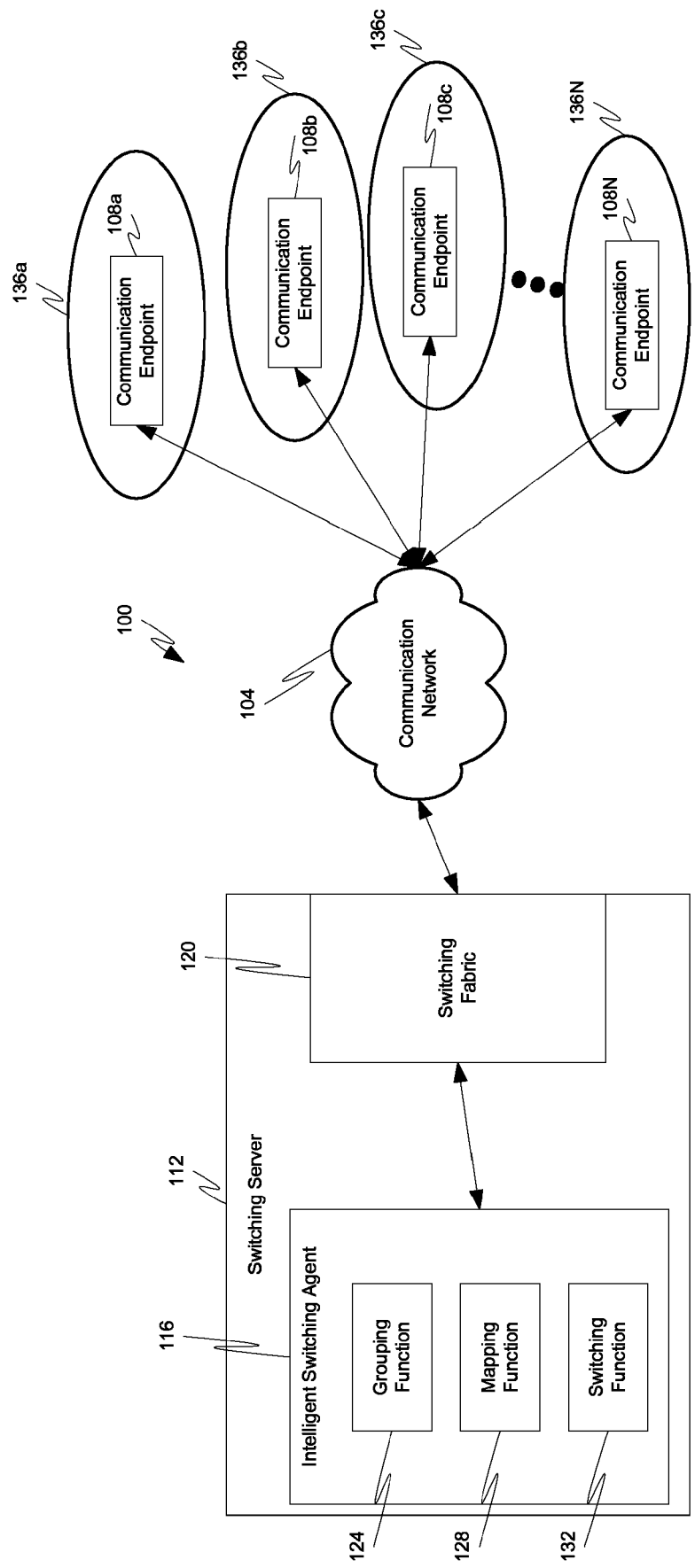
FIG. 1A is a block diagram of a communication system having a first configuration in accordance with embodiments of the present invention.
Figure 1B:
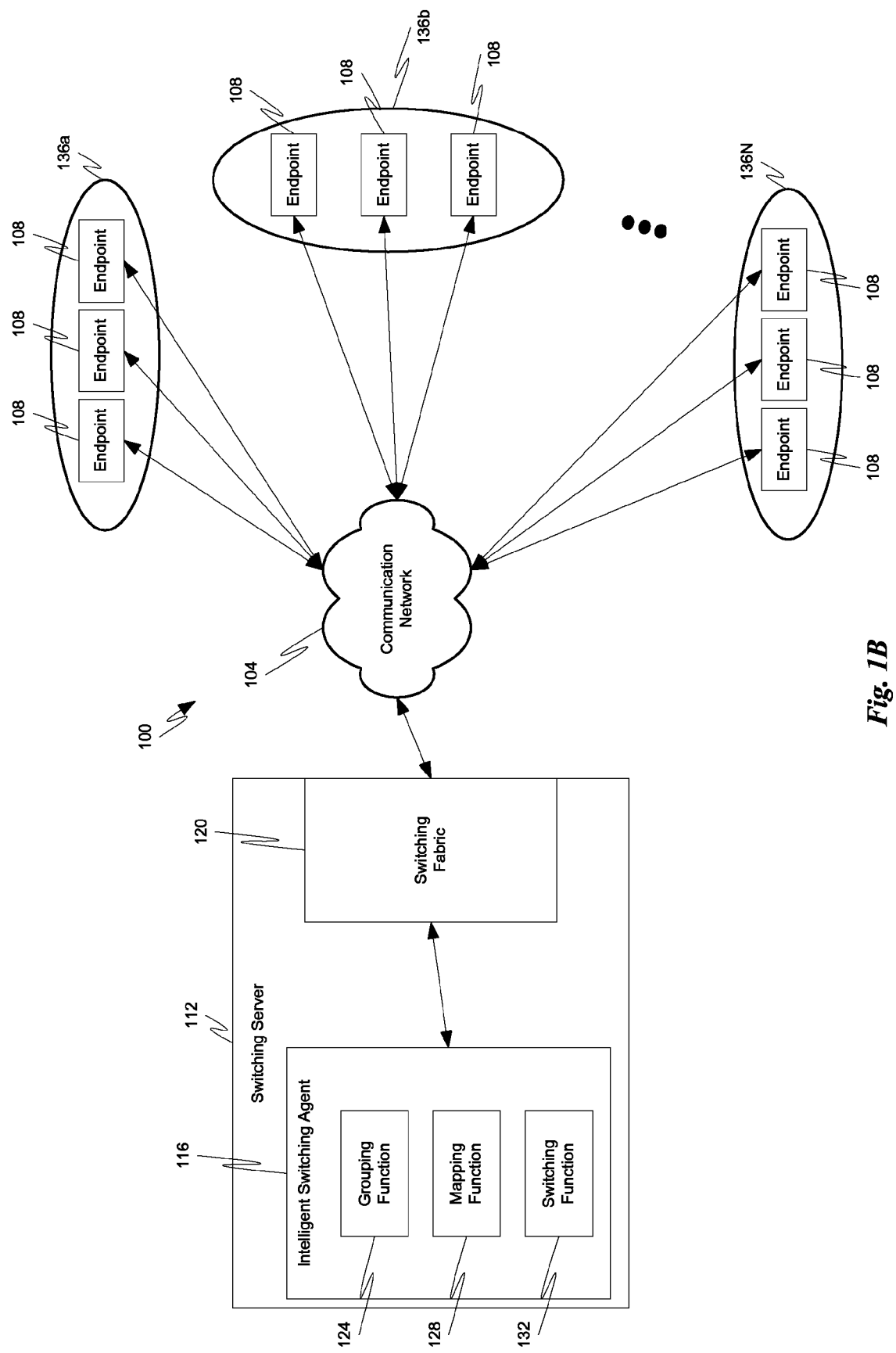
FIG. 1B is a block diagram of a communication system having a second configuration in accordance with embodiments of the present invention.
Figure 1C:
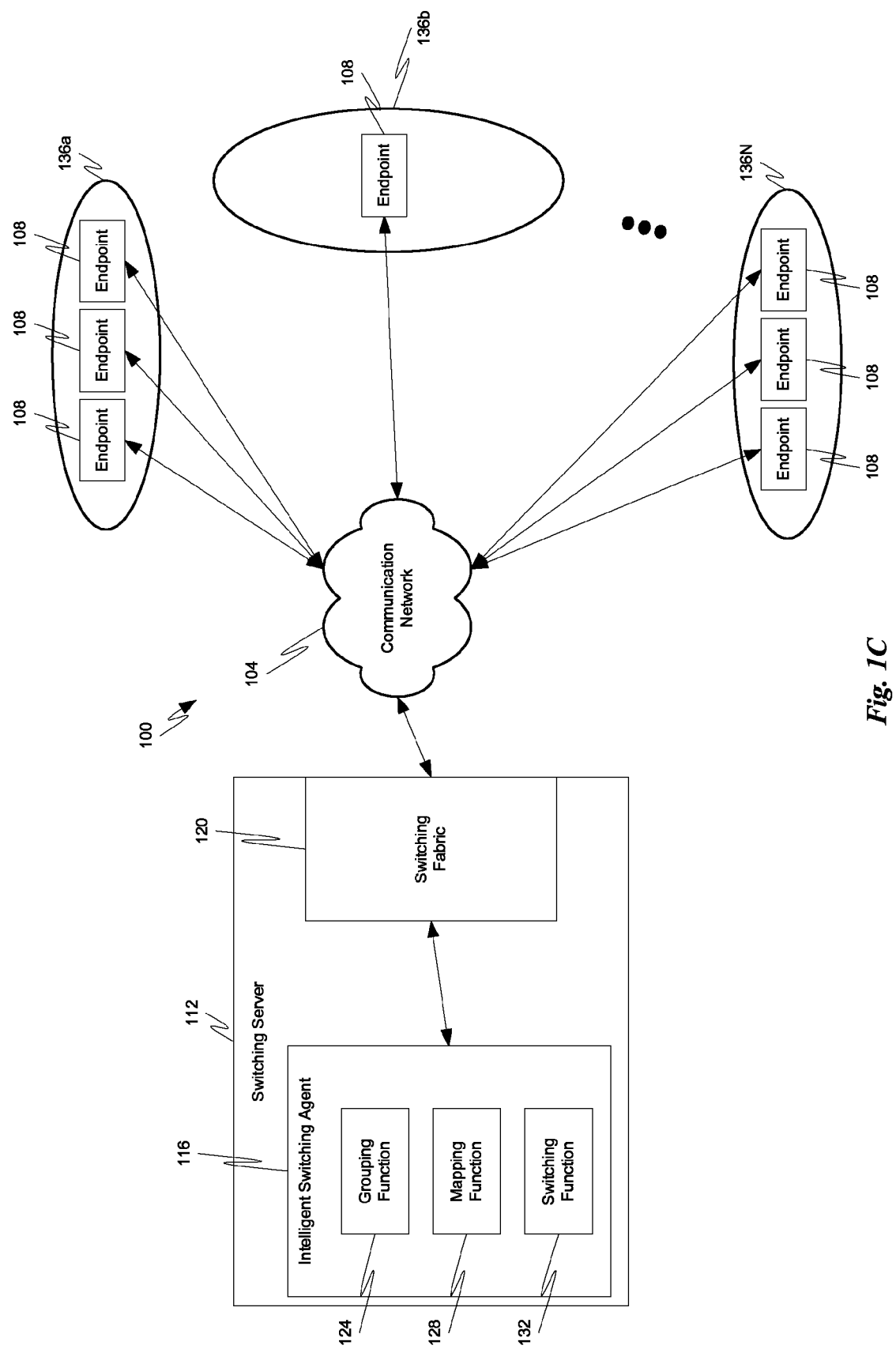
FIG. 1C is a block diagram of a communication system having a third configuration in accordance with embodiments of the present invention.

Referring initially to FIGS. 1A-C, an exemplary communication system 100 will be described in accordance with at least some embodiments of the present invention. In accordance with at least one embodiment of the present invention, a communication system 100 comprising a first configuration will be described in connection with FIG. 1A. The communication system 100 generally comprises a communication network 104 through which communication signals, data, media streams, and other content may be transmitted from a communication endpoint 108 to another communication endpoint 108.

The communication network 104 may comprise any type of information transportation medium and may use any type of protocols to transport messages between endpoints. The communication network 104 may include wired and/or wireless communication technologies. The Internet is an example of the communication network 104 that constitutes and IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, an MLPS network, and any other type of packet-switched or circuit-switched network known in the art. In addition, it can be appreciated that the communication network 104 need not be limited to any one network type, and instead may be comprised of a number of different networks and/or network types.

As can be seen in FIG. 1A, the communication system 100 may include a number of communication or multimedia conference endpoints 108. For example, the system 100 may include a first communication endpoint 108a, a second communication endpoint 108b, a third communication endpoint 108c, and an nth communication endpoint 108n. However, a lesser or greater number of communication endpoints 108 than is shown in the example illustration may be included. In general, as will be described in greater detail elsewhere herein, each communication endpoint 108 generally supports video and audio communications as well as data communications with one or more other multimedia conference endpoints. Furthermore, each communication endpoint 108 may be associated with one or more persons or multimedia conference participants. Each communication endpoint 108 may further be associated with a different location.

The multimedia conferencing system 100 also generally includes a switching server 112. In general, the switching server 112 functions to coordinate and synchronize switching of media streams from a collection or group of communication endpoints 108 to another collection or group of communication endpoints 108. The switching server 112 may be in communication with some or all of the communication endpoints 108 included in a multimedia conference call through the communication network 104. The switching server 112 may also be associated with one or more communication endpoints 108 through a direct connection. Furthermore, such direct connection may comprise integration of a communication endpoint 108 with the switching server 112.

The switching server 112 may be adapted to intelligently group two or more communication endpoints 108 together, map the group of communication endpoints 108 to another group of communication endpoints 108, and then intelligently control the switching of media streams between the communication endpoints 108 based upon the grouping of communication endpoints 108. To this end, and in accordance with at least some embodiments of the present invention, the switching server 112 may comprise an intelligent switching agent 116 and a switching fabric 120. The intelligent switching agent 116 may further comprise a grouping function 124, a mapping function 128, and a switching function 132.

The grouping function 124 of the switching server 112 may be adapted to place one or more of the communication endpoints 108 into a group 136. The placement of communication endpoints 108 into groups 136 helps to establish relationships between communication endpoints 108 that will facilitate an intelligent and efficient routing of media between the endpoints 108. More specifically, by assigning endpoints 108 to groups 136, the switching server 112 is enabled to synchronize the switching of media streams between endpoints 108 and further create a multimedia conferencing system that avoids the deployment of transcoding/scaling/mixing centralized MCU while still delivering most features provided by a continuous presence or telepresence system. This also increases system capacity (i.e., the number of endpoints 108 that may be included in a single multimedia conference) and reduces packet latency.

The mapping function 128 is adapted to establish routing parameters for media streams received from a particular endpoint 108 in a particular group 136. More particularly, the mapping function 128 is adapted to map groups to each other such that there is a minimal requirement for transcoding, rate matching, picture resizing, codec negotiation, etc. as media flows between different groups 136. If no match is possible between any participants (i.e., endpoints 108) in two or more groups 136, then the mapping function 128 may be adapted to create a bridge line between the non-matching groups such that media exchanges between those groups are transcoded.

The mapping function 128 may be adapted to map groups 136 and endpoints 108 within groups 136 in a number of different ways. As one example, two groups 136 may exist that have all participants (i.e., endpoints 108) co-located. In this case, multiple participants can be seen together by all other participants because the displays/cameras of the endpoints are physically together. In another example, all participants in one group 136 may be co-located while some or all participants in another group 136 are physically dispersed. In this example, multiple participants can be seen together by the physically co-located group 136 but media feed from one of the participants (e.g., the loudest speaker) in the co-located groups 136 is switched to all participants in the dispersed group 136. As yet another example, some or all participants in both groups 136 may be physically dispersed. In this case, all the participants in one group 136 see only one other participant from the other group 136 at any given time, but the participants never see video from other participants in their own group.

The switching function 132 may be adapted to synchronize the media switching (i.e., perform group switching) by switching media streams from a set of cameras on a site belonging to a particular group 136 to another set of displayed in other sites at different groups 136. The mapping for group switching can be N-to-N or N-to-M (or vice versa), where N and M are greater than zero and N is not equal to M. The endpoints 108, which are the source of media streams being provided to other endpoints 108 (e.g., when the associated participant is the loudest speaking participant), may be provided with an option to receive either their own video or the video from the previous set of endpoints that were active. The switching function 132 may be adapted to execute switching of media streams by employing the switching fabric 120, which may correspond to a collection of communication/network ports (logical and/or physical).

As can be seen in FIG. 1A, and in a first configuration of system 100 elements, M may be equal to 1 and the traditional voice activated switching may be used to fan the media stream associated with the loudest speaker to all other participants in the conference. This represents an N-to-1 switching of media streams. Thus, each group 136 may utilize the routing preferences of the endpoint 108 assigned thereto. In this particular configuration, each endpoint 108 will receive the same media stream from the switching server 112 (with the exception of the loudest speaking participant) and will therefore display the same video content. When another participant begins to speak, the switching server 112 will determine that the media streams need to be switched from the previous speaker to the current speaker and utilize the switching function 132 and switching fabric 120 to effect this switching of media streams. When media streams are switched, the content displayed on the communication endpoints 108 will have their displayed altered to display the media stream from the new speaking participant (with the exception of the new speaking participant's endpoint 108, which may continue to display the previous speaker's media stream).

With reference to FIG. 1B, and in a second configuration of system 100 elements, an N-to-N switching of media between endpoints 108 is depicted. Media streams associated with N endpoints 108 in a first group 136 are switched as a group to corresponding N endpoints 108 at other groups 136. When doing N-to-N switching, the audio from one of the microphones associated with an endpoint 108 may be used along with all the N multimedia streams (when the N endpoints 108 in a group 136 are co-located). In this particular configuration, the switching server 112 may be adapted to switch the media streams from the endpoints 108 based upon switching rules associated with the group 136, rather than switching rules or preferences associated with endpoints 108. Alternatively, or in combination, the switching rules or preferences associated with an endpoint 108 may also be considered during a group based switching; particularly when an endpoint switching rule 108 does not conflict with a group switching rule.

With reference now to FIG. 1C, and in a third configuration of system 100 elements, an N-to-M switching of media between endpoints 108 is depicted. Media streams associated with N endpoints 108 in a first group 136*a* are switched as a group to corresponding M endpoints 108 in a second group 136*b*. For instance, when a site with three cameras is being switched to a site with a single camera and single display unit, the media stream from the center camera in the first group 136*a* may be used and continuously directed toward the endpoint 108 in the second group 136*b*. Alternatively, voice activity detection may be used to decide which hone of the endpoints' 108 multimedia in the first group 136*a* should be switched to the endpoint 108 in the second group 136*b*. Conversely, media from the second group 136*b* with a single endpoint 108 can be switched to a group 136 with three endpoints 108 such that it is displayed in the center display (e.g., the center endpoint 108). The left and right displays (e.g., the other endpoints 108 in the group 136) may show media from the previously active site or from other permanently selected source.

Figure 2:
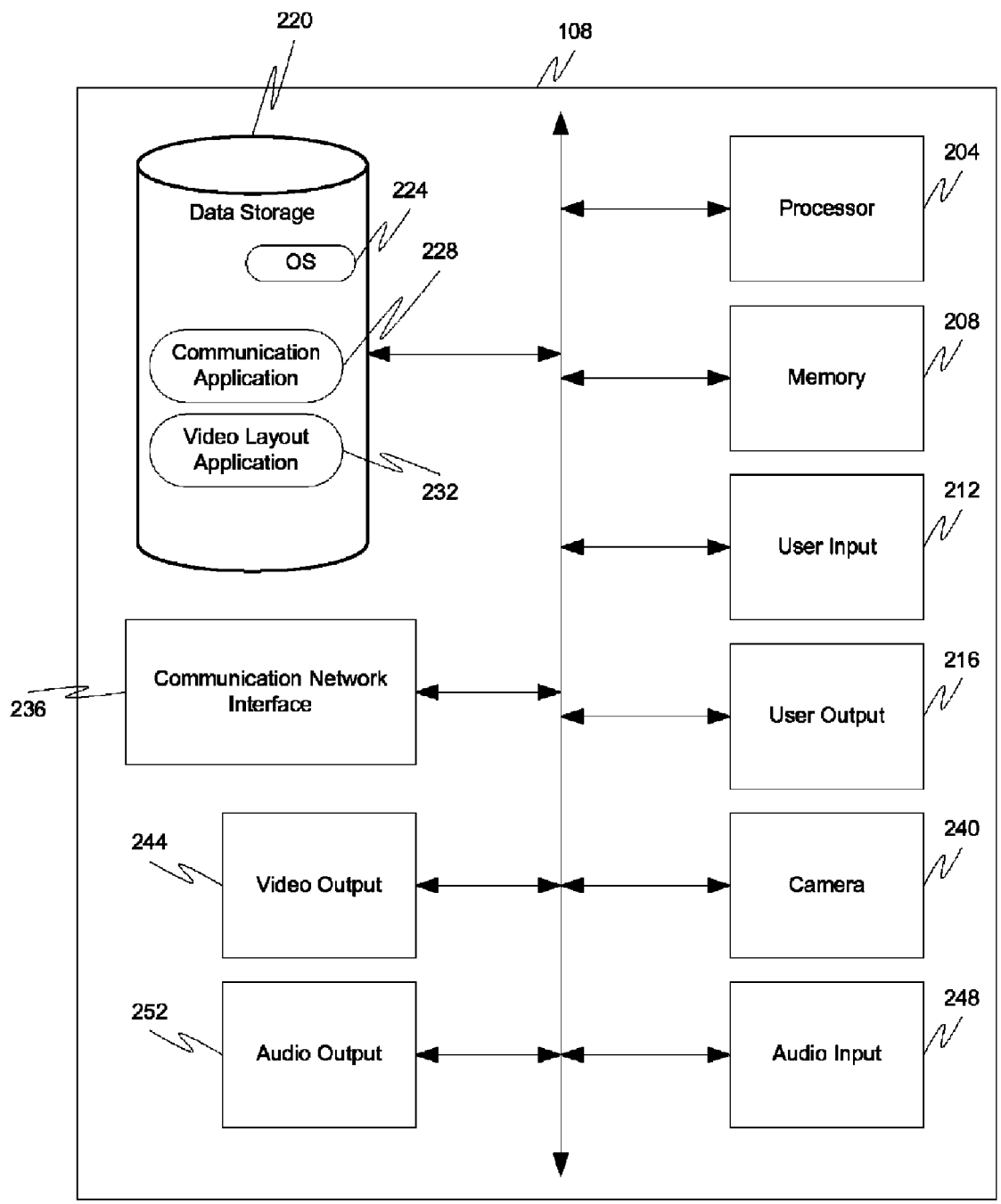
FIG. 2 is a block diagram depicting a communication endpoint in accordance with embodiments of the present invention.

With reference now to FIG. 2, components that may be provided as part of or in association with a communication endpoint 108 are illustrated. The components may include a processor 204 capable of executing program instructions. Accordingly, the processor 204 may include any general purpose programmable processor or controller for executing application programming. Alternatively, the processor 204 may comprise a specially configured application specific integrated circuit (ASIC). The processor 204 generally functions to run programming code implementing various of the functions performed by the communication endpoint 108 including video layout functions as described herein.

A communication endpoint 108 may additionally include memory 208 for use in connection with the execution of programming by the processor 204 and for the temporary or long term storage of data or program instructions. The memory 208 may comprise solid state memory resident, removable or remote in nature, such as DRAM and SDRAM. Where the processor 204 comprises a controller, the memory 208 may be integral to the processor 204.

In addition, various user input devices 212 and user output devices 216 may be provided. Examples of input devices 212 include a keyboard, numeric keypad, mouse, roller-ball, and pointing device combined with a screen or other position encoder. Examples of user output devices 216 include an alphanumeric display, ringer, printer port or indicator lights.

A communication endpoint 108 may also include data storage 220 for the storage of application programming and/or data. For example, operating system software 224 may be stored in the data storage 220. The operating system software 224 may be adapted to provide control over and a uniform user interface for access to the various other applications stored on the communication endpoint 108. Examples of applications that may be stored in the data storage 220 include communication application software 228. As can be appreciated by one of skill in the art, a communication application 228 may comprise instructions for implementing a soft video telephone, for example where the communication endpoint 108 comprises a general purpose computer. Another example of an application that may be stored in the data storage 220 includes video layout application software 232. In particular, a communication endpoint 108 may include video layout application software 232 for performing multimedia display layout functions as described herein. The data storage 220 may comprise a magnetic storage device, a solid state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

A communication endpoint 108 may also include one or more communication network interfaces 236. For example, a communication endpoint 108 may include a communication network interface 236 comprising a network interface card (NIC), a modem, a telephony port, a serial or parallel or data port, or other wire line or wireless communication network interface.

In addition, a communication endpoint 108 generally includes one or more imaging cameras 240. The camera 240 functions to obtain an image of persons using the communication endpoint 108 to participate in a multimedia communication session, including a multimedia conference. Accordingly, the camera 240 may comprise a digital camera having optical elements, such as a lens system with selectable zoom and/or focus capabilities, and electronic elements, such as a charge coupled device (CCD) for converting image information collected by the optical elements into digital image data.

An exemplary communication endpoint 108 also generally includes a video output or display device 244. The video output 244 may be used to display image information from one or more remote communication endpoints 108 or a group 136 of endpoints 108. In addition, control and status information may be presented through the video output 244. Examples of a video output 244 include a cathode ray tube (CRT), liquid crystal display (LCD), plasma display or other device capable of reproducing transmitted video images.

In connection with the support of audio communications, a communication endpoint 108 may include an audio input 248 and an audio output 252. The audio input 248 may comprise a microphone for receiving audio information from persons at the location of the communication endpoint 108. The audio output device 252 may include one or more speakers or headphones.

As can be appreciated by one of skill in the art from the description provided herein, the particular components that are included as part of a communication endpoint 108 will generally be determined by those components and functions necessary to support the included features of the communication endpoint 108. Accordingly, a particular communication endpoint 108 may not include each of the components and applications illustrated in FIG. 2. Furthermore, the components and number of components included in one communication endpoint 108 may differ from the components and number of components included in another communication endpoint 108.

Figure 3:
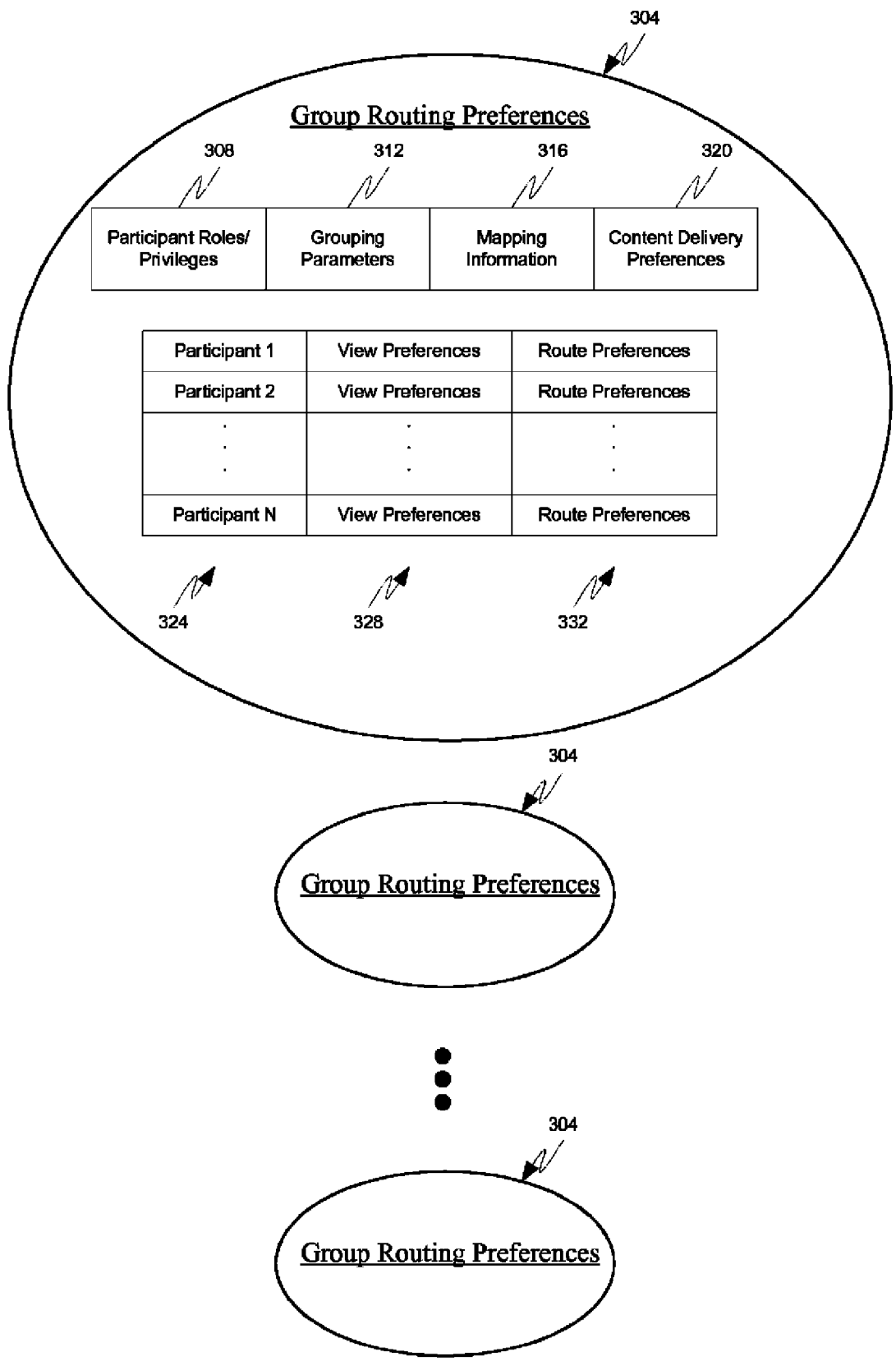
FIG. 3 is a block diagram depicting a series of data structures employed in accordance with embodiments of the present invention.

With reference now to FIG. 3, an exemplary set of data structures used to facilitate group switching of media streams will be described in accordance with at least some embodiments of the present invention. The data structures may include one or more group routing preference 304 data structures. Each group routing preference 304 data structure may be associated with a different group 136 of communication endpoints 108. Thus, the group routing preference 304 data structure may represent a combination of the individual routing preferences associated with each endpoint 108 or may represent a higher-level set of preferences defined for the group 136 either by the conference host, a system administrator, or the lowest-common denominator of abilities of the endpoints 108.

In accordance with at least some embodiments of the present invention, the group routing preferences 304 may comprise a hierarchical structure that considers both the overall group routing preferences before considering the individual routing preferences. The utilization of a routing hierarchy can help to facilitate efficient group switching and mapping between groups 136. The overall group preferences may include a participant roles/privileges field 308, a grouping parameters field 312, a mapping information field 316, and a content delivery preferences field 320.

The participant roles/privileges field 308 may define roles and/or privileges associated with each participant (i.e., endpoint 108) in a particular group 136. Furthermore, the participant roles/privileges field 308 may define the hierarchy of privileges among participants. For example, one participant may be considered the group leader. This particular participant may be allowed to define the group routing preferences. Furthermore, a participant may be considered the conference host, which may allow the participant to define group routing preferences for other groups 136, even though that participant does not belong to those groups.

The grouping parameters 312 may define the criteria that are used when assigning endpoints 108 to groups 136. Grouping of endpoints 108 may be accomplished in a number of different ways. Examples of grouping parameters and considerations include, but are not limited to, grouping by administrator configuration, IP address, geolocation information, grouping and tagging in Session Description Protocol (SDP), grouping using a conference control protocol (e.g., CCCP or CCMP), grouping based on signaling identity, and grouping based on third party identity assertions.

In a grouping by administrator configuration, a participant or set of participants to a multimedia conference may be known before the conference begins. In one scenario, a set of participants from company A are to be in a conference with a set of participants from company B. The participants and their respective endpoints 108 for each group (e.g., company A or company B) may not necessarily be in the same location but they are associated with the same company. Accordingly, the conference host can assign participants from the same company to the same group.

In a grouping by IP address configuration, the IP addresses of each endpoint 108 can be discovered from at the switching server 112 by analyzing the signaling or media packets received from each endpoint 108. The IP address may reveal geographic, service provider, and enterprise information about the user. For example, if it is known that one set of participants is primarily participants from the New York area (based on IP addresses assigned to each endpoint 108) and another set of participants are primarily from the California area (also based on IP addresses), the IP addresses could be used to make a determination of grouping. In other words, the endpoints 108 from the New York area may be assigned to one group 136 while the endpoints 108 from the California area. Of course, travel and VPNs could frustrate this grouping; however, it may also allow people associated with a particular area be assigned to a common group, regardless of their current location.

In a grouping by geolocation information configuration, geolocation information associated with each endpoint 108 may be used to create groups 136 of endpoints 108 more specifically, many endpoints 108 are aware of their geolocation (e.g., by having a Global Positioning System (GPS) device integrated therein) and have the capability to share this information with other Internet hosts. For example, in the Session Initiation Protocol (SIP), the Location header field can be used to convey this geolocation information. Other protocols such as Hypertext Transport Protocol (HTTP) have methods of tagging and transmitting geolocation information as well. Also, mobile and other service providers know this information about their customers based upon the wireless access point that is being utilized by the endpoint 108 to access the communication network. Utilization of any of these mechanisms may facilitate the grouping of endpoints 108 based on geographic location.

In a grouping by tagging in SDP configuration, an SDP offer/answer exchange is used to initiate the communication session between an endpoint 108 and the switching server 112. SDP signals are used to convey grouping and tagging information inside the signaling itself. For example, the attribute a=label can be used to attach a label to a particular media stream or a group of media streams. This can be used by the switching server 112 to automatically group like media streams together. Additional details are discussed in Handley, M., Jacobson, V., and C. Perkins, "SDP: Session Description Protocol", RFC 4566, July 2006, the entire contents of which are incorporated herein by reference.

In a grouping by conference control protocol configuration, CCCP or CCMP can be used to control a server acting as a mixer or selector for a conference. It is also possible to use a conference control protocol such as those listed above to achieve a conference distributed among a number of mixers. CCCP and CCMP are both discussed further in Levin, O., R. Even, P. Hagendorf, "Centralized Conference Control Protocol," IETF Internet Draft, December 2005 and Barnes, M., Bouton, C., Romano, S. P., Schulzrinne, H., "Centralized Conference Manipulation Protocol" IETF Internet Draft, November 2008, the entire contents of which are incorporated herein by reference.

In a grouping by signaling identity configuration, a signaling protocol, such as SIP, is used to allow the switching server 112 to authenticate users and determine their identity upon session initiation. Based on an authenticated identity, groupings can be created using lists or regular expressions. For instance, all identities of *@sales.example.com could grouped together and identities of *@engineering.example.com could be grouped together for a sales and engineering conference call. Additional details of SIP are discussed in Rosenberg, J., Schulzrinne, H., Camarillo, G., Johnston, A., Peterson, J., Sparks, R., Handley, M., and E. Schooler, "SIP: Session Initiation Protocol", RFC 3261, June 2002, the entire contents of which are incorporated herein by reference.

In a grouping by third party identity assertions configuration, a third party identity assertion mechanism such as SAML, WS-Security, or digital certificates can be employed to assign endpoints 108 to groups 136. More particularly, if certain endpoints 108 are utilizing digital certificates provided by a common authority, then those endpoints 108 may be assigned to a common group 136.

The mapping information 316 may comprise capability information for each endpoint 108 and/or group 136 of endpoints in the conference. Furthermore, the mapping information field 316 may comprise information related to the mapping between groups 136. For instance, the mapping information field 316 may comprise data related to the types of codes, data rates, picture size, etc. that is to be used when streaming media from a first group 136 to a second group 136 and vice versa. More specifically, each group 136 and/or endpoint 108 within a group 136 may comprise a specific mapping (based on negotiated codecs, etc.) to another group 136 and/or endpoint 108 within a group 136. The codec information that may be included in the mapping information field 316 includes, but is not limited to, video codec information (e.g., H.621, H.623, H.624, etc.), audio codecs (e.g., G.722, G.711, G.726, G.729, etc.), data, and other types of codec information. The codec information may convey the bit rate, frame rate, display, and other capabilities associated with an endpoint 108 or group 136 if the group 136 was created based on capability matching between endpoints 108. The mapping information field 316 is used to reflect whether a mapping based on capability matches from one group 136 to another group 136 is possible. If mapping is possible, then the amount of transforms/transcoding required to facilitate the multimedia conference is reduced. Otherwise, the mapping information field 316 may indicate that a bridge line is needed for communications between a particular endpoint 108 or group 136 if no mapping is possible. If a bridge line is used, then transcoding and/or data transformations may be required for communications between endpoints 108 and/or groups 136. Advantageously, a single bridge line may be created between groups 136 of differing capabilities and that single bridge line may be utilized to perform a single transcoding step for communications between any endpoint 108 within the groups 136. This reduces the amount of transcoding that is required if there are multiple endpoints 108 in a group 136 that have similar capabilities but different from the capabilities of endpoints 108 in another group 136.

The content delivery preferences field 320 may comprise information related to the group content delivery preferences. For instance, the content delivery preferences may define group 136 switching logic that will cause a media stream from a first endpoint 108 in a first group 136 to be directed toward a first endpoint 108 in a second group 136 when a certain event occurs (e.g., a particular participant, and not necessarily the first endpoint 108 in the first group 136, begins speaking). Thus, the switching logic for non-speaking participants may be defined based on group routing preferences 304. When that same event occurs, for example, the group 136 switching logic may also define which media streams are provided to the participants in the first group 136 when one of their members is speaking and, thus, being broadcast to other endpoints 108 not in that group 136. Additional examples of group 136 switching logic will become apparent to those skilled in the art based on the disclosure provided herein.

The group routing preferences 304 may also include a collection of individual routing preferences. The group routing preferences 304 may be organized in a hierarchical structure such that any defined group content delivery preferences 320 supersede any individual content routing preferences, if there are conflicts between such preferences. Furthermore, the individual routing preferences of a host participant may supersede the individual routing preferences of any non-host participant, if there are conflicts between such preferences. The preferences that may be considered and maintained in the group routing preferences 304 include, but are not limited to, viewing preferences 328 and routing preferences 332. Each individual preference may be associated with a participant (identified by the participant identifier field 324) in a particular group 136. As can be seen in FIG. 3, each group 136 may comprise their own set of group routing preferences 304 and the group routing preferences 304 may vary from group 136 to group 136. However, the mapping between endpoints 108/ groups 136 as well as the capabilities of the endpoints 108/ groups 136 may define, to a certain extent, the group routing preferences 304 of all groups 136 in the conference. More particularly, group routing preferences 304 may be defined to minimize the amount of transcoding, rate matching, picture resizing, etc. required during the multimedia conference.

Figure 4:
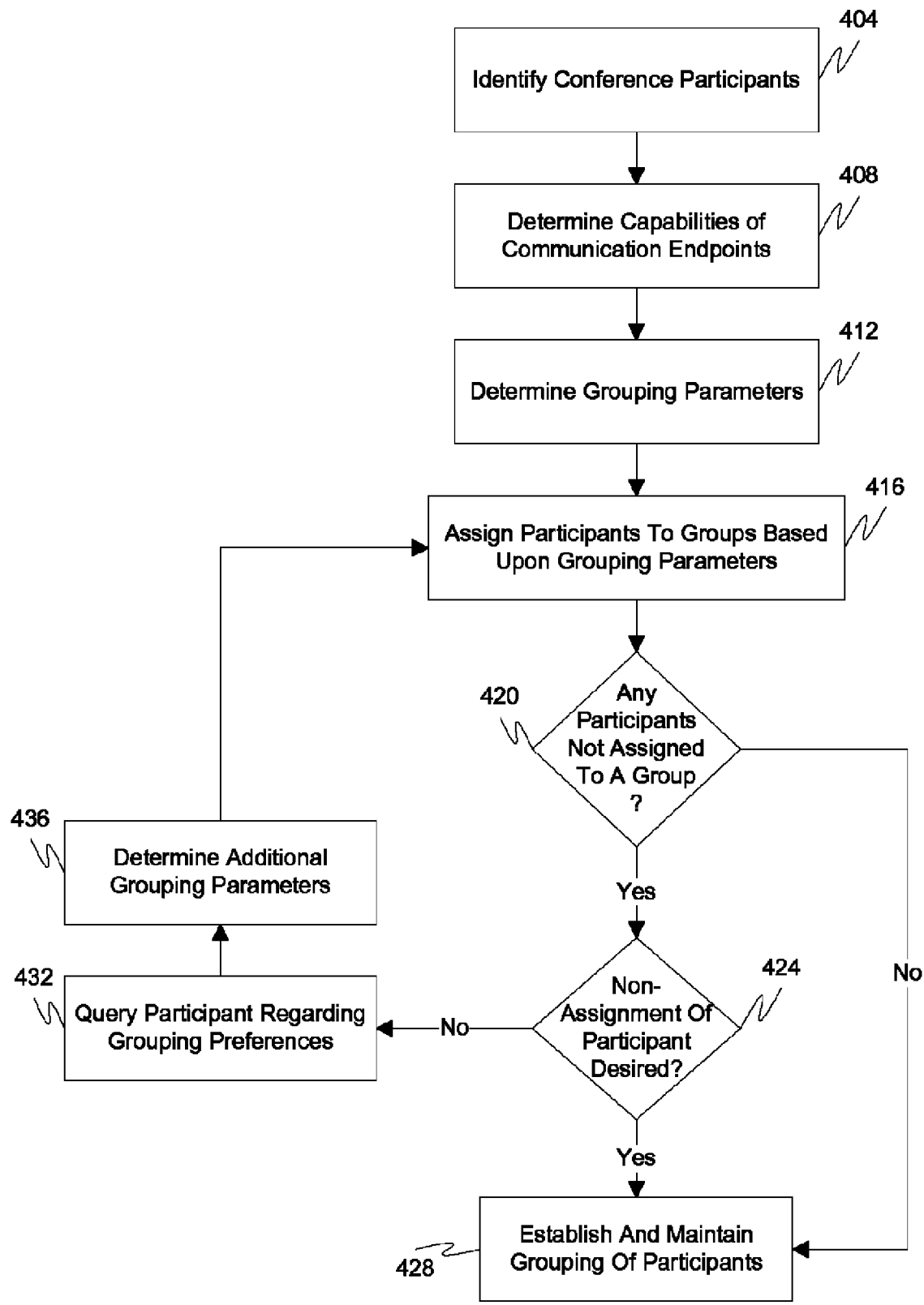
FIG. 4 is a flow diagram depicting an endpoint grouping method in accordance with embodiments of the present invention.

With reference now to FIG. 4 an exemplary endpoint 108 grouping method will be described in accordance with at least some embodiments of the present invention. The method is initiated by identifying all of the conference participants (step 404). This step is typically performed before a conference begins (i.e., when the conference host identifies the invitees to the conference). Alternatively, or in combination, conference participants may be identified as they connect to the switching server 112.

After the conference participants have been identified, the capabilities of their associated endpoints 108 are determined (step 408). In accordance with at least some embodiments of the present invention, there may be one or more participants associated with a single endpoint 108. As an example, one endpoint 108 may comprise a single camera and single display unit and may be used by a single participant. As another example, one endpoint 108 may comprise multiple cameras and/or displays and may be used by one or more participants. The types of capabilities that are determined for an endpoint 108 in this step include, but are not limited to, the number of cameras at the endpoint 108, the number of displays at the endpoint 108, the number of audio receiving devices at the endpoint 108, the number of speakers at the endpoint 108, the types of codecs (audio and video) supported at the endpoint 108, the display resolution of the display devices at the endpoint 108, the media types (e.g., audio, video, data, etc.) supported at the endpoint 108, and other attributes of the endpoint 108.

Once the endpoint 108 capabilities have been determined, grouping parameters or rules are identified (step 412). The types of grouping parameters or configurations include, but are not limited to, administrator-defined grouping, IP Address-based grouping, location-based grouping, SDP-based grouping, conference control protocol-based grouping, signaling identity-based grouping, and third party identity assertion-based grouping. One or more of these grouping parameters may be used to assign endpoints 108 and participants to groups 136. These parameters may be selected by the conference host before the initiation of the conference or may be selected by the switching server 112 based on business rules (e.g., grouping parameters may be selected in an attempt to minimize transcoding, maximize bandwidth utilization, maximize conversation intelligibility, etc.).

After the grouping parameters have been determined, the identified participants and/or their associated endpoints 108 are assigned to groups 136 based upon the determined grouping parameters (step 416). It is then determined whether any participants have not been assigned to a group (step 420). If the response to this query is negative, then the groups 136 are established for the conference and maintained by the switching server 112 during the conference (step 428). If, however, there is at least one participant or endpoint 108 not assigned to a group, then it is determined whether the non-assigned participants are intended to be assigned to an individual group 136 without any other endpoints 108 (step 424). This query may be answered by the switching server 112, if for example, the switching server 112 is driven by grouping rules that require each participant to be grouped with at least one other participant. Alternatively, the non-assigned participant and/or conference host may be asked whether the non-assignment of that participant is desired. If the non-assignment of the participant is desired, then the method continues to step 428.

If the non-assignment of the participant was not desired, then the method continues by querying the non-assigned participant, the conference host, or some other entity with administrative privileges what grouping preferences should be used to assign the non-assigned participant to a group (step 432). The response to this query is used to determine additional grouping parameters that can be used to assign the previously non-assigned participant to a group 136 (step 436). After the additional grouping preferences have been determined based on the participant input, the method returns to step 416.

Figure 5:
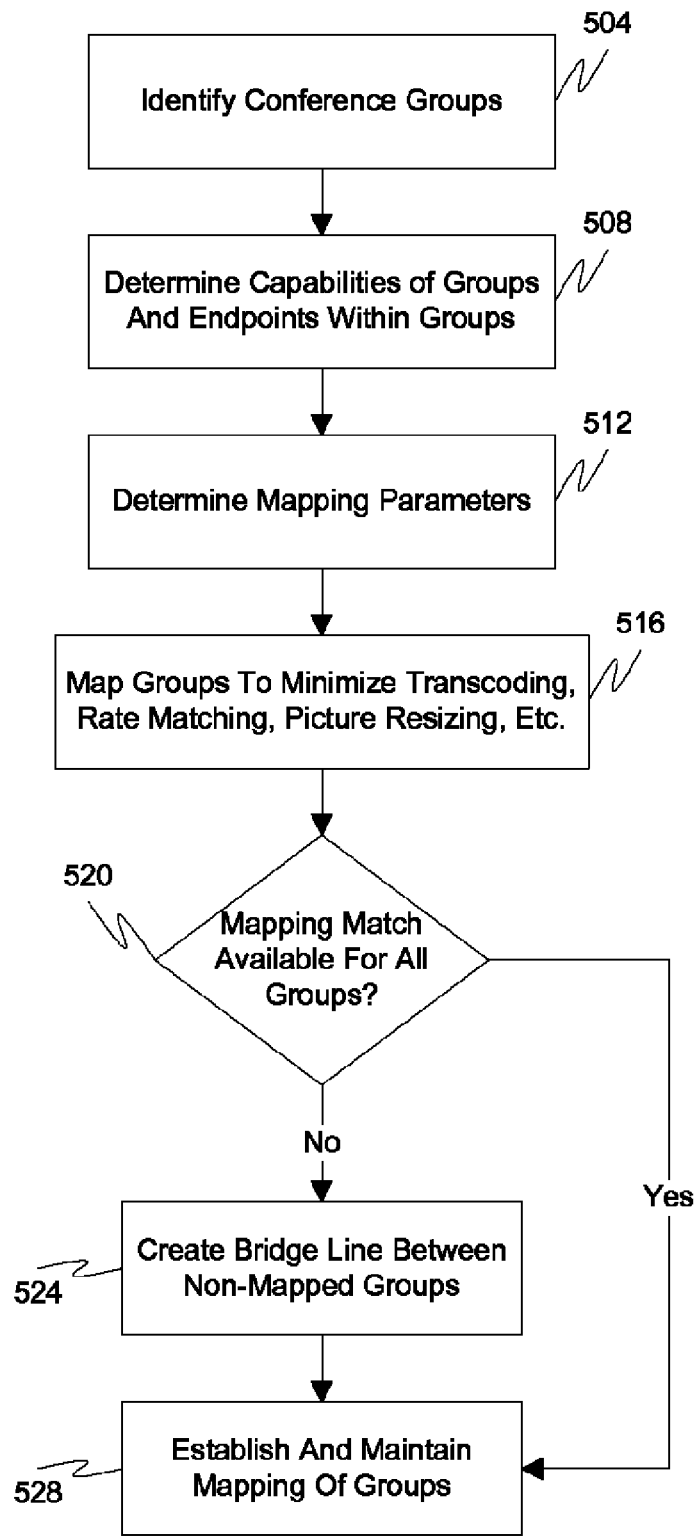
FIG. 5 is a flow diagram depicting an endpoint/group mapping method in accordance with embodiments of the present invention.

With reference now to FIG. 5, an exemplary endpoint 108 mapping method will be described in accordance with at least some embodiments of the present invention. The method begins by identifying the various conference groups 136 that are participating in the conference (step 504). In a minimal case, each group 136 comprises one endpoint 108. However, efficiencies associated with utilizing certain embodiments of the present invention are realized when at least one of the groups 136 comprises two or more endpoints 108. After the groups 136 have been identified, the method continues by determining the capabilities of the groups 136 and/or the capabilities of the endpoints 108 within each group 136 (step 508). The capabilities that maybe identified include, but are not limited to, media capabilities (e.g., media types supported), codec capabilities (e.g., codecs supported), and codec attributes (i.e., the attributes of the supported codecs). The capability of each endpoint can be discovered using known signaling methods (e.g., SIP SDP) where the SDP lists the capability in terms of media supported, codec(s) supported for that media, and attributes of the codec supported. Below is an example of the SDP for an endpoint 108 with audio/video capabilities.

```
v=0
o=alice 2891092738 2891092738 IN IP4 w-land.example.com
s=Cool stuff
e=alice@w-land.example.com
t=0 0
c=IN IP4 w-land.example.com
m=audio 49000 RTP/AVP 0
a=rtpmap:0 PCMU/8000
b=AS:384
m=video 52230 RTP/AVP 34
a=rtpmap:34 H263/90000
a=fmtp:34 CIF=1;QCIF=2;BPP=256;MaxBR=3200
```

This participant supports both audio and video media. For video media the codec supported it H.263 and for this codec the supported picture size is CIF at 30 fps and 320 kbs. By providing a weighting scheme where the media type carries the highest weight, followed by the codec and then the codec attributes we can find the closest match between a participant in one group and a participant in another group.

Thereafter, the method continues by mapping groups 136 and/or endpoints 108 based on the determined mapping parameters in an attempt to minimize transcoding, rate matching, picture resizing, and reduce any other processing as well as meet any other defined business goal (step 515).

There may be a number of ways that endpoints 108 and/or groups 136 are mapped to one another. As one example, the media properties between the endpoints 108 and the switching server 112 are negotiated by trying to find a match between the following parameters arranged in the following hierarchy. In accordance with one embodiment of the present invention, media types such as audio, video, applications, and so on are given a weight (e.g., M1, M2, M3, etc.). Each codec for a given media type is also given a weight (e.g., M1C, M1C2, M2C1, etc.). Furthermore, each codec attribute is given a weight (e.g., M1C1A1, M1C1A2, M2C1A1, etc.). In the mapping step, the weights are assigned in such a way that the SUM(MnCn) is less than ANY(Mn). Similarly the SUM (MnCnAn) is less than ANY(MnCn). Furthermore, the total endpoint 108 or group 136 capability=SUM(Mn)+SUM (MnCn)+SUM(MnCnAn). This endpoint 108 or group 136 capability weight helps in two ways:

1) It allows the switching server 112 to find a closest match for an endpoint 108 in one group 136 to map to an endpoint 108 in another group 136.

2) It also allows groups 136 to be formed based on capability.

If an exact score of weights exists between endpoints 108 and/or groups 136, then the switching server 112 can elect the highest matching score and the codecs associated with determining said score. A perfect match of the assigned weights indicates that different endpoints 108 comprise the same capabilities and can be mapped to each other at those capabilities. Thus, when a perfect match does exist and the endpoints 108 are mapped together based on the perfectly matching scores, the amount of transcoding required for carrying communications between the matching endpoints 108 is zero. Instead, the signal can be forwarded from one endpoint 108 to the other endpoint 108 without any transformation. Even scores that are relatively close (i.e., comprise the same media type scores and codec scores but slightly different attribute scores), it may be possible to map endpoints 108 to one another without requiring transcoding. For example, if different endpoints 108 support different attributes via the same codec, then the endpoints 108 can be mapped together without requiring any transcoding and the attributes are allowed to slightly differ. If there is some amount of match available that supports the creation of mapping between two endpoints 108 or a group 136 of endpoints, then the method continues to step 528 where the mapping of endpoints 108 and/or groups 136 is established and maintained for the conference (step 528). The mapping information is used during the conference to assist the switching server 112 in making switching decisions during the conference. Once the matching endpoints 108 are found, further signaling negotiation may be used for both the mapped participants to converge on common media stream properties.

In the event that at least one endpoint 108 is not capable of being mapped to at least one other endpoint 108 or group 136 of endpoints, then the method proceeds by creating a bridge line between the non-mapped endpoint 108 or group 136 of endpoints (step 524). In this step, the bridge line is created such that media into and out of the non-mapped endpoint 108 is transcoded to a format supported by the other endpoints 108 or group 136 of endpoints in the conference. After the bridge line is created for the non-mapped endpoint 108, the method continues to step 528.

As can be appreciated by one skilled in the art, groups 136 can also have a single bridge line or mapping such that all endpoints 108 within that group 136 utilize the common bridge line or mapping. This is particularly useful when groups 136 are created based on capability. Therefore, each endpoint 108 within one group 136 may communicate with endpoints 108 of another group 136 using the same bridge line or mapping. Furthermore, if one endpoint 108 in one group 136 is communicating with multiple endpoints 108 in another group 136, the media stream from the single endpoint may only need to be transcoded once (if a bridge line exists between the groups 136) or utilize a single mapping before it is provided to all other endpoints 108 in the other group 136.

Figure 6:
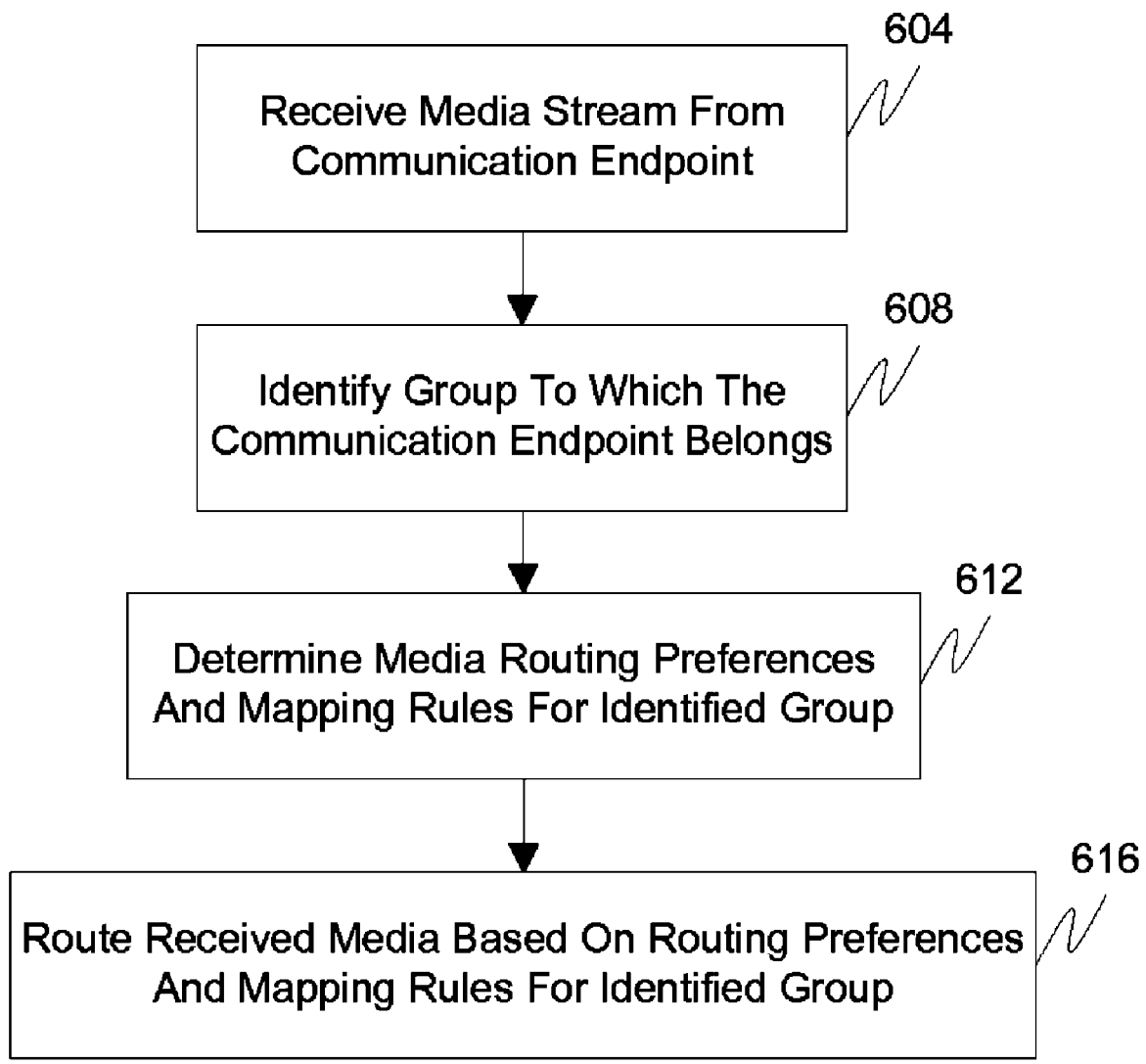
FIG. 6 is a flow diagram depicting a switching method in accordance with embodiments of the present invention.

Referring now to FIG. 6, an exemplary switching method will be described in accordance with at least some embodiments of the present invention. The method begins when a media stream is received from a communication endpoint 108 or group 136 of endpoints 108 at the switching server 112 (step 604). The received media signal may include an audio stream, a video stream, and/or data content. Upon receiving the media stream the switching server 112 identifies the group 136 from which the media stream originated (i.e., by identifying the endpoint 108 that originated the media stream and identifying which group 136 that endpoint 108 belongs to) (step 608). Based on this information, the switching server 112 determines media routing preferences for the received media stream (step 612). More particularly, the switching server 112 refers to the mapping rules for the received media stream and further identifies the media routing rules. The mapping rules define how media received from a particular endpoint 108 are to be provided to other endpoints 108 whereas the routing preferences define the media streams (i.e., which media streams from various endpoints 108) that should be provided to each endpoint 108 or group 136 of endpoints. The mapping rules are generally determined in the mapping method described in relation to FIG. 5, whereas the routing preferences are generally determined based on the group routing preferences 304.

Once the switching server 112 has determined the appropriate mapping rules and routing preferences for the received media stream, the switching server 112 continues by routing the received media based on the routing preferences and mapping rules (step 616). As can be appreciated by one skilled in the art, the mapping rules and routing preferences may be based on group routing rules 304 and/or individual participant routing preferences. Furthermore, the mapping rules may vary from group 136 to group 136 and/or endpoint 108 to endpoint 108. Thus, when routing preferences define that a received media stream is to be provided to multiple endpoints 108 or groups 136 of endpoints, it is possible that different mappings are used for providing the different media streams. Furthermore, some media streams may need to be transcoded (e.g., via a bridge line) whereas other media streams may not require transcoding.

The multimedia conference may be operated by switching multimedia from one group 136 to all other groups 136. The group 136 selection (for display) criteria may be chosen by the operator and may correspond to voice activity, round robin, or at a user request. This may be executed when there are N-sized homogeneous groups 136 with N-to-N mapping. There could also be a case where there are some endpoints 108 (camera and display) that cannot be grouped. In this case, an N-to-N as well as N-to-one mapping (and switching) may be required. When a group 136 of size N is switched to a site of size 1, then either the center camera or the camera associated with the loudest audio can be chosen to be switched and directed to the display on the group 136 with one endpoint 108. Conversely, the camera at the group 136 with a single endpoint 108 can be permanently switched and directed toward the center display at the group 136 with multiple endpoints 108.

A more involved case would involve switching between groups 136 of size N to groups 136 of size M. If N is greater than M, then all cameras of the group 136 with M endpoints 108 can be switched and directed at the group 136 with N endpoints 108 and the remaining (N-M) displays can keep displaying the stream from the previously active endpoint's 108 camera. As noted above, not all endpoints 108 in a logical grouping may have the same capabilities in terms of support for codecs, resolution, or frame rate. In accordance with at least some embodiments of the present invention, the mapping and switching functions of the switching server 112 may employ intelligent matching to map endpoints of the same or similar capabilities together. This helps reduce the amount of transcoding required.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for providing mechanisms for switching groups of endpoints. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A conferencing method, comprising:
   connecting a plurality of endpoint devices together in a conferencing session;
   creating a first conference group that comprises at least first and second endpoints of the plurality of endpoint devices;
   creating a second conference group that comprises at least a third endpoint;
   reading content delivery preferences associated with the first group; and
   directing content from the at least a first and second endpoints based on the preferences associated with the first group;
   determining at least one of media type capabilities, codec capabilities, and codec attribute capabilities for each endpoint in each of the first and second conference groups;
   mapping the endpoints from the first conference group to endpoints in the second conference group based on the determined at least one of media type capabilities, codec capabilities, and codec attribute capabilities;
   utilizing the mapping to convey media streams from the at least first and second endpoints in the first conference group to the at least a third endpoints in the second conference group;
   assigning a respective score to each of the determined at least one of media type capabilities, codec capabilities, and codec attribute capabilities;
   summing the assigned scores for each endpoint in each of the first and second conference groups;
   comparing the summed score for the first endpoint to the summed score for the at least a third endpoint;
   based on the comparing step, determining that the first endpoint and the at least a third endpoint are capable of utilizing a common codec; and
   allowing the first endpoint and the at least a third endpoint to utilize the common codec during the conferencing session when the first endpoint is switched to the at least a third endpoint.

2. The method of claim 1, wherein directing content comprises:
   receiving a media stream from the first and second endpoints;
   determining, based on reading the content delivery preferences associated with the first group, that the media stream associated with the first endpoint is to be provided to the at least a third endpoint; and
   providing the media stream associated with the first endpoint to the at least a third endpoint.

3. The method of claim 2, wherein the content delivery preferences associated with the first group further define a target endpoint for the media stream associated with the second endpoint when the media stream associated with the first endpoint is provided to the at least a third endpoint, the method further comprising:
   providing the media stream associated with the second endpoint to the target endpoint.

4. The method of claim 3, wherein the target endpoint belongs to the second conference group and wherein the at least a third endpoint and the target endpoint comprise common location information and are grouped based on the common location information.

5. The method of claim 4, wherein the first and second endpoints are grouped according to at least one of administrator configuration, IP address, location information, Session Description Protocol (SDP) information, and conference control protocol information.

6. The method of claim 1, wherein the second conference group comprises common codec capabilities, wherein a codec has been negotiated between the first endpoint and the at least a third endpoint for use during the conference and wherein the first endpoint is mapped to other endpoints in the second conference group with the codec that was negotiated between the first endpoint and the at least a third endpoint.

7. The method of claim 6, wherein the second endpoint is incapable of being mapped to the at least a third endpoint, the method further comprising:
creating a bridge line between the second endpoint and the at least a third endpoint, wherein media streams transmitted over the bridge line are transcoded.

8. The method of claim 1, wherein the first and second endpoints are not co-located such that a participant associated with the first endpoint is unable to observe or hear media presented to a participant associated with the second endpoint, the method further comprising:
determining that a media stream received from the second endpoint is to be provided to all conference groups in the conferencing session;
providing the media stream received from the second endpoint to the endpoints in the conference groups in the conference session; and
providing a media stream from an endpoint other than the first endpoint to the second endpoint.

9. A non-transitory computer readable storage medium comprising processor executable instruction operable to perform the method of claim 1.

10. A switching server, comprising:
switching fabric operable to connect a plurality of endpoint devices together in a conferencing session; and
an intelligent switching agent operable to create a first conference group that comprises at least first and second endpoints, create a second conference group that comprises at least a third endpoint, read content delivery preferences associated with the first group, and direct content from the at least first and second endpoints based on the preferences associated with the first group, wherein the intelligent switching agent is further operable to determine at least one of media type capabilities, codec capabilities, and codec attribute capabilities for each endpoint in each of the first and second conference groups, map the endpoints from the first conference group to endpoints in the second conference group based on the determined at least one of media type capabilities, codec capabilities, and codec attribute capabilities, and utilize the mapping to convey media streams from the endpoints in the first conference group to the endpoints in the second conference group, wherein the intelligent switching agent maps the endpoints from the first conference group to the endpoints in the second conference group:
assigning a respective score to each of the determined at least one of media type capabilities, codec capabilities, and codec attribute capabilities;
summing the assigned scores for each endpoint in each of the first and second conference groups;
comparing the summed score for the first endpoint to the summed score for the at least a third endpoint;
based on the comparing step, determining that the first endpoint and the at least a third endpoint are capable of utilizing a common codec; and
allowing the first endpoint and the at least a third endpoint to utilize the common codec during the conferencing session when the first endpoint is switched to the at least a third endpoint.

11. The server of claim 10, wherein the intelligent switching agent if further operable to receive a media stream from the first and second endpoints, determine, based on reading the content delivery preferences associated with the first group, that the media stream associated with the first endpoint is to be provided to the at least a third endpoint, and provide the media stream associated with the first endpoint to the at least a third endpoint, and wherein the content delivery preferences associated with the first group are based, at least in part, on business rules that include at least one of minimize transcoding, minimize rate matching, minimize picture resizing, and minimize codec negotiation.

12. The server of claim 11, wherein the content delivery preferences associated with the first group further define a target endpoint for the media stream associated with the second endpoint when the media stream associated with the first endpoint is provided to the at least a third endpoint, and wherein the intelligent switching agent if further operable to provide the media stream associated with the second endpoint to the target endpoint.

13. The server of claim 12, wherein the target endpoint belongs to the second conference group and wherein the at least a third endpoint and the target endpoint comprise common location information and are grouped based on the common location information.

14. The server of claim 13, wherein the first and second endpoints are grouped according to at least one of administrator configuration, IP address, location information, Session Description Protocol (SDP) information, and conference control protocol information.

15. The server of claim 10, wherein the second conference group comprises common codec capabilities, wherein a codec has been negotiated between the first endpoint and the at least a third endpoint for use during the conference and wherein the first endpoint is mapped to other endpoints in the second conference group with the codec that was negotiated between the first endpoint and the at least a third endpoint, wherein the second endpoint is incapable of being mapped to the at least a third endpoint, and wherein the switching server is further operable to create a bridge line between the second endpoint and the at least a third endpoint such that media streams transmitted over the bridge line are transcoded by the switching server.

16. The server of claim 10, wherein the first and second endpoints are not co-located such that a participant associated with the first endpoint-is unable to observe or hear media presented to a participant associated with the second endpoint, wherein the intelligent switching agent is further operable to determine that a media stream received from the second endpoint is to be provided to all conference groups in the conferencing session, provide the media stream received from the second endpoint to the endpoints in the conference groups in the conference session, and provide a media stream from an endpoint other than the first endpoint to the second endpoint.

* * * * *